US009661191B2

(12) United States Patent
Muraki et al.

(10) Patent No.: US 9,661,191 B2
(45) Date of Patent: May 23, 2017

(54) IMAGE CAPTURE APPARATUS HAVING FUNCTION OF GENERATING FRAME SYNCHRONIZATION SIGNAL AT CONSTANT CYCLE

(71) Applicant: CASIO COMPUTER CO., LTD., Shibuya-ku, Tokyo (JP)

(72) Inventors: Jun Muraki, Tokyo (JP); Hiroyuki Kato, Tokyo (JP); Shohei Sakamoto, Tokyo (JP); Hideaki Matsuda, Tokyo (JP); Hiroshi Shimizu, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/857,689

(22) Filed: Sep. 17, 2015

(65) Prior Publication Data
US 2016/0142592 A1    May 19, 2016

(30) Foreign Application Priority Data

Nov. 19, 2014    (JP) ................................ 2014-234628

(51) Int. Cl.
H04N 5/04    (2006.01)
H04N 9/44    (2006.01)
H04N 5/06    (2006.01)
H04N 5/232    (2006.01)
H04N 5/247    (2006.01)
H04N 5/376    (2011.01)

(52) U.S. Cl.
CPC .............. *H04N 5/06* (2013.01); *H04N 5/232* (2013.01); *H04N 5/247* (2013.01); *H04N 5/3765* (2013.01)

(58) Field of Classification Search
CPC ............... H04N 5/232; H04N 5/23229; H04N 5/23203; H04N 5/23206; H04N 9/82; H04N 9/8227; H04N 13/02; H04N 13/0239
USPC ............................. 348/47, 51, 513, 500, 521
IPC .................................................. H04N 5/04,9/44
See application file for complete search history.

(56) References Cited

U.S. PATENT DOCUMENTS

| 7,840,228 B2 * | 11/2010 | Suemitsu ................. H03L 7/08 370/350 |
| 8,400,965 B2 | 3/2013 | Aoyama et al. |
| 8,922,660 B2 * | 12/2014 | Yamagata ............ H04N 5/2251 348/164 |

(Continued)

FOREIGN PATENT DOCUMENTS

| JP | 63286072 A | 11/1988 |
| JP | 2000092373 A | 3/2000 |

(Continued)

OTHER PUBLICATIONS

Japanese Office Action (and English translation thereof) dated Oct. 11, 2016 issued in counterpart Japanese Application No. 2014-234628.

*Primary Examiner* — Trang U Tran
(74) *Attorney, Agent, or Firm* — Holtz, Holtz & Volek PC

(57) ABSTRACT

An image capture apparatus including a timing generator that generates a frame synchronization signal with a constant cycle receives a reference signal generated at a predetermined interval based on a predetermined reference cycle, compares generation timing of the reference signal received with generation timing of the frame synchronization signal generated by the timing generator, and adjusts a generation (Continued)

cycle of the frame synchronization signal generated by the timing generator based on a result of the comparison.

15 Claims, 7 Drawing Sheets

(56) References Cited

U.S. PATENT DOCUMENTS

| | | | |
|---|---|---|---|
| 8,937,647 B2 * | 1/2015 | Yoshizawa | G11B 27/00 |
| | | | 348/47 |
| 2012/0242805 A1 | 9/2012 | Tyou | |
| 2013/0242135 A1 | 9/2013 | Muraki et al. | |

FOREIGN PATENT DOCUMENTS

| | | | |
|---|---|---|---|
| JP | 2012204987 A | 10/2012 | |
| JP | 2013141070 A | 7/2013 | |
| JP | 2013225826 A | 10/2013 | |

* cited by examiner

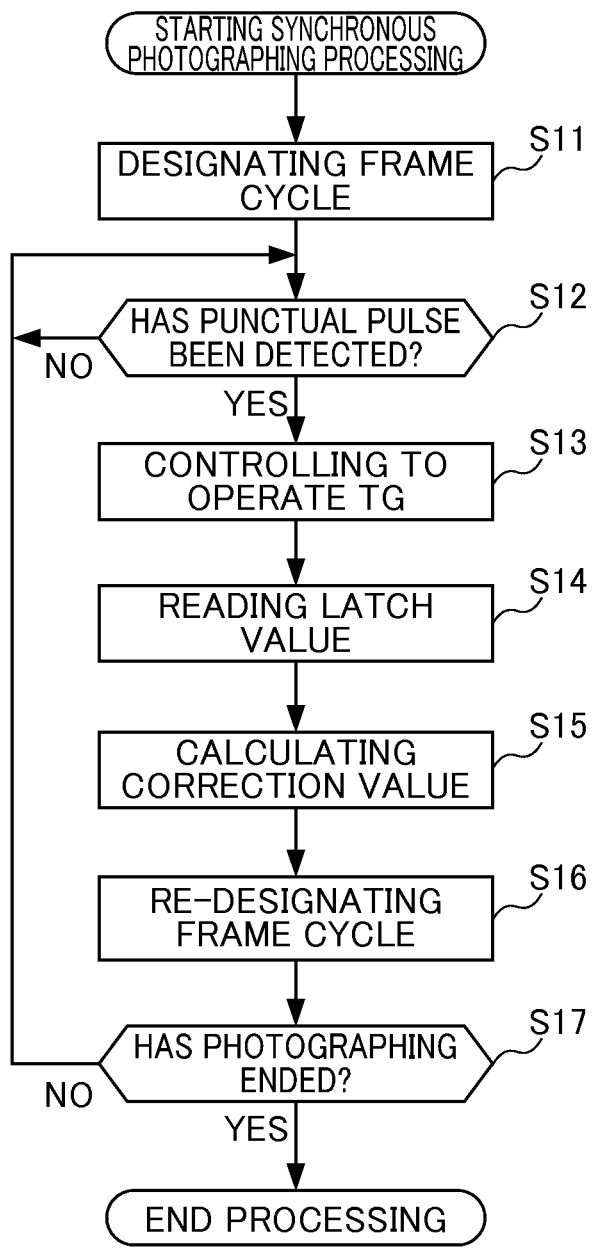

US 9,661,191 B2

IMAGE CAPTURE APPARATUS HAVING FUNCTION OF GENERATING FRAME SYNCHRONIZATION SIGNAL AT CONSTANT CYCLE

This application is based on and claims the benefit of priority from Japanese Patent Application No. 2014-234628, filed on 19 Nov. 2014, the content of which is incorporated herein by reference.

BACKGROUND OF THE INVENTION

Field of the Invention

The present invention relates to an image capture apparatus having a function of generating a frame synchronization signal at a constant cycle, an image capture control method, and a program.

Related Art

Conventionally, a technology has been known in which, in order to improve synchronization accuracy upon performing synchronous photographing with a plurality of cameras (image capture apparatuses), each of the cameras receives a high-accuracy reference time signal from the outside such as GPS (Global Positioning System) so as to mutually synchronize the timing of generating frame synchronization signals generated by a timing control unit of each camera at a constant cycle, based on the reference time signal (for example, refer to Japanese Unexamined Patent Application, Publication No. 2013-225826). According to the technology disclosed in Japanese Unexamined Patent Application, Publication No. 2013-225826, since a timing deviation is corrected based on an absolute reference time, by each of the cameras simply correcting the timing deviation with respect to the reference time individually, without considering relative deviations among each of the cameras, it consequently becomes possible to improve the synchronization accuracy of photography timing among the plurality of cameras.

Patent Document 1: Japanese Unexamined Patent Application, Publication No. 2013-225826

SUMMARY OF THE INVENTION

One aspect of the present invention is an image capture apparatus which includes a timing generator that generates a frame synchronization signal with a constant cycle; a communication unit that receives a reference signal generated at a predetermined interval based on a predetermined reference cycle; and a processor that compares generation timing of the reference signal received by the communication unit with generation timing of the frame synchronization signal generated by the timing generator, and adjusts a generation cycle of the frame synchronization signal generated by the timing generator based on a result of the comparison.

Another aspect of the present invention is an image capture control method executed by an image capture apparatus which includes allowing a timing generator to generate a frame synchronization signal at a constant cycle; receiving a reference signal generated at a predetermined interval based on a predetermined reference cycle; comparing generation timing of the reference signal received by the communication unit with generation timing of the frame synchronization signal generated by the timing generator, and adjusting a generation cycle of the frame synchronization signal generated by the timing generator based on a result of the comparison.

A yet another aspect of the present invention is a non-transitory storage medium encoded with a computer-readable program that enables a computer to execute functions as: a timing generation function that generates a frame synchronization signal with a constant cycle; a reference signal input function that inputs a reference signal generated at a predetermined interval based on a predetermined reference cycle; a comparison function that compares generation timing of the reference signal inputted by the function of the reference signal input function with generation timing of the frame synchronization signal generated by the timing generation function; and an adjustment function that adjusts a generation cycle of the frame synchronization signal generated by the function of the reference signal input function based on a result of the comparison.

BRIEF DESCRIPTION OF THE DRAWINGS

FIG. 7 is a flowchart illustrating a flow of synchronous photographing processing executed by the image capture apparatus of FIG. 2 having the functional configuration of FIG. 6.

DETAILED DESCRIPTION OF THE INVENTION

In the following, embodiments of the present invention will be explained with reference to the drawings.

Figure 1:
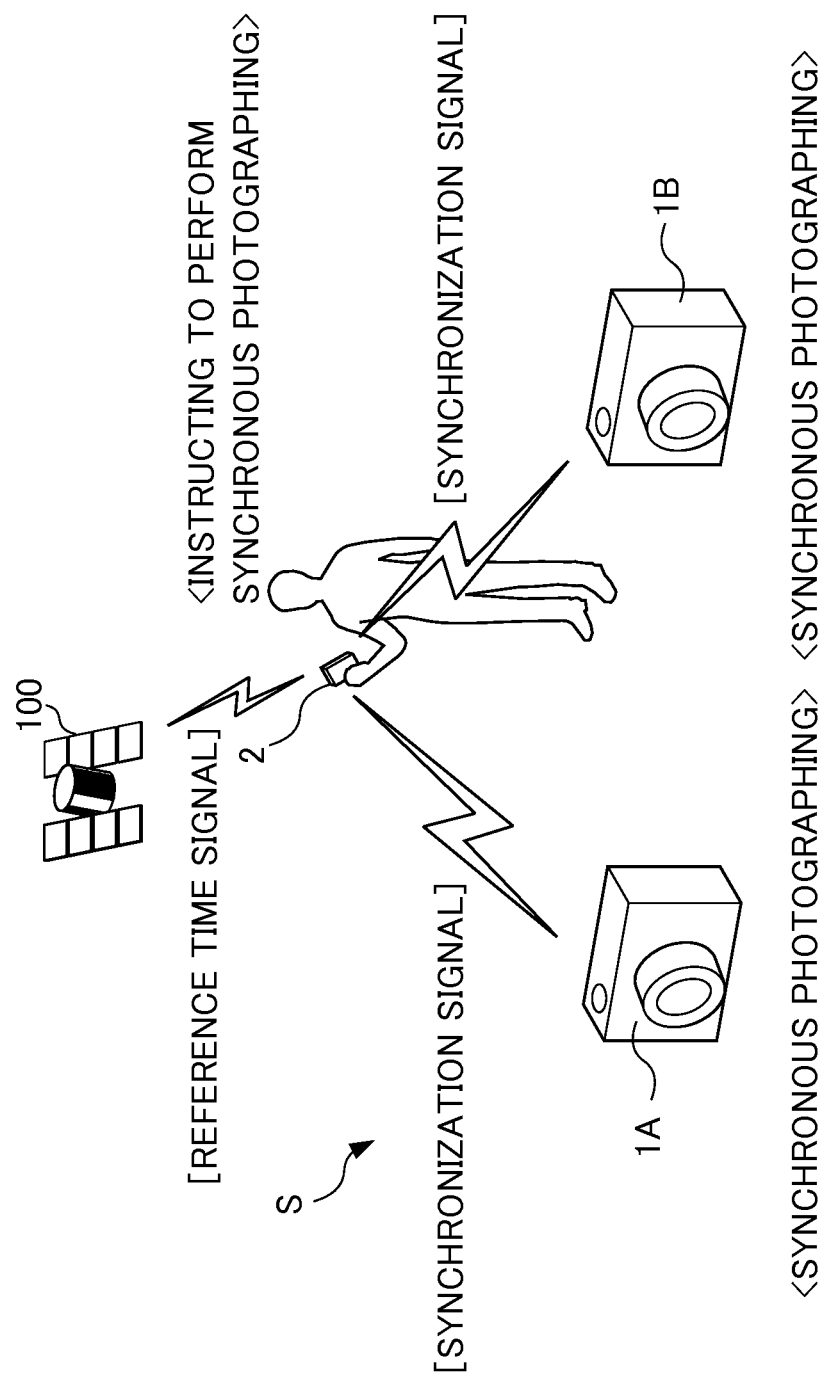
FIG. 1 is a system configuration diagram illustrating a system configuration of a synchronous photographing system according to an embodiment of the present invention.

FIG. 1 is a system configuration view illustrating a system configuration of a synchronous photographing system according to an embodiment of the present invention.

A synchronous photographing system S according to the present embodiment is configured by a plurality of image capture apparatuses 1A and 1B, and a synchronization control apparatus 2, as illustrated in FIG. 1.

The image capture apparatuses 1A and 1B are configured to make it possible to perform photographing of a moving image at a high frame rate (for example, 1000 fps). Furthermore, the image capture apparatuses 1A and 1B perform synchronous photographing of moving images based on a synchronization signal transmitted from the synchronization control apparatus 2.

The synchronization control apparatus 2 is an apparatus which performs instructing to set a frame rate for moving image photography or to perform synchronous photographing of a moving image with the image capture apparatuses 1A and 1B, as well as performing synchronization control so as to match the timing of photographing, and performs communication to transmit a synchronization signal between the image capture apparatus 1A and the image capture apparatus 1B. In such a synchronization control apparatus 2, GPS signals are received which include high-accuracy reference time signals from a satellite 100, and the synchronization control apparatus 2 generates a synchronization signal based on the reference time signal thus received and transmits the synchronization signals to the image capture apparatuses 1A and 1B.

In the image capture apparatus 1 (the image capture apparatuses 1A and 1B) used for the synchronous photographing system S configured as above, deviation of photography timing arises due to temperature changes in individual apparatuses or variations of clock source frequency due to accuracy error upon designing or manufacture of the original clock sources of timing generators (TG) that drive image capture elements, and furthermore, the deviation of photography timing accumulates over time, whereby so significant deviation arises that the influence appears in the number of frames.

Therefore, in the synchronous photographing system S according to the present embodiment, the deviation of photography timing at the image capture apparatuses 1 is made to match based on the synchronization signals transmitted from the synchronization control apparatus 2, and the synchronous photographing for the image capture apparatuses 1A and 1B is performed by anticipating the difference in the number of frames arising from the deviation of the photography timing accumulating, then changing subsequent photography timing so as to make the final number of frames match.

Figure 2:
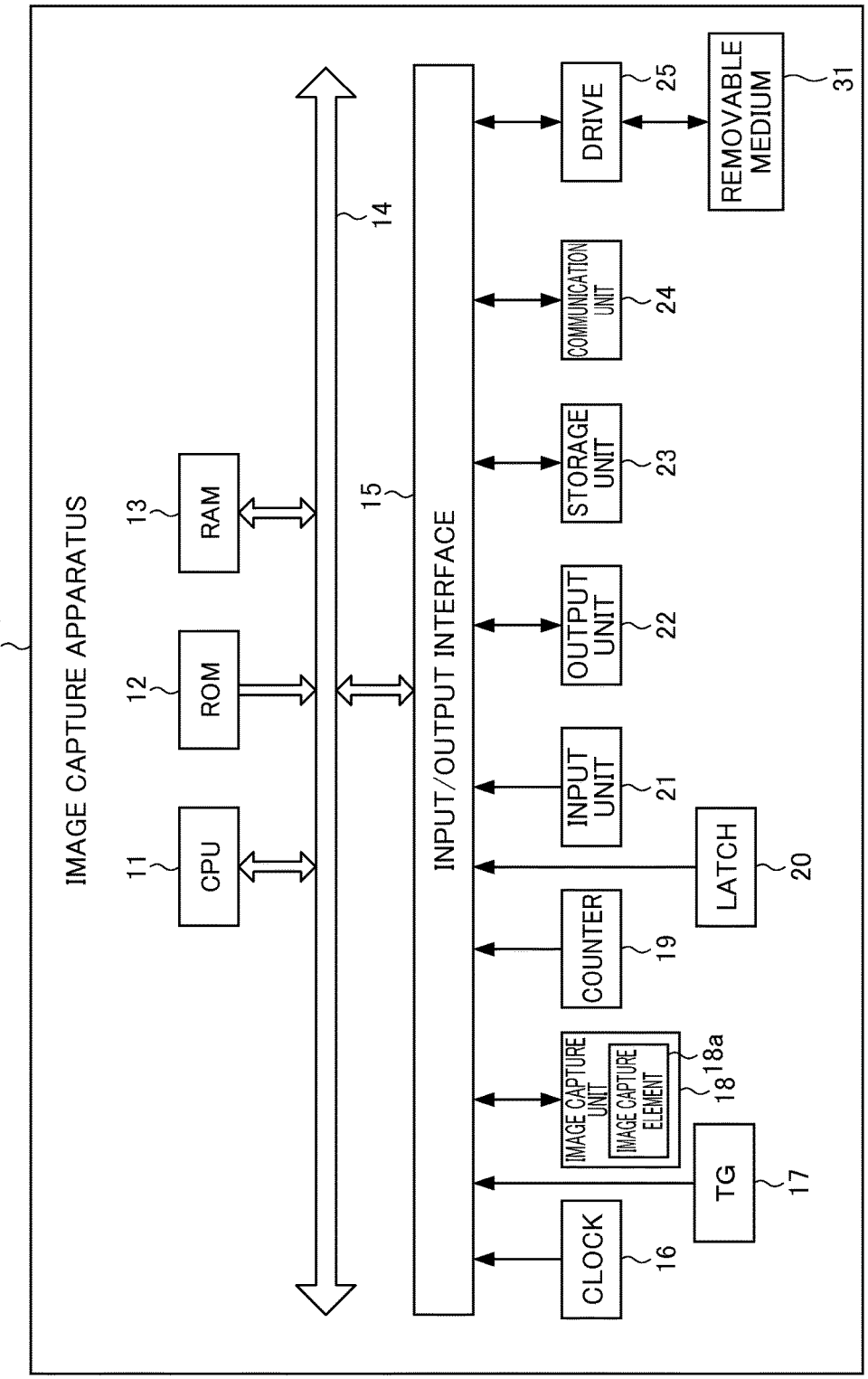
FIG. 2 is a block diagram illustrating a hardware configuration of an image capture apparatus according to an embodiment of the present invention.

FIG. 2 is a block diagram illustrating a hardware configuration of the image capture apparatus 1 (image capture apparatuses 1A and 1B) according to the present embodiment. It should be noted that when explaining the image capture apparatus 1 and the synchronization control apparatus 2 separately below, the image capture apparatus 1 is denoted by "-1 (-1A, -1B)" after a reference symbol and the synchronization control apparatus 2 is denoted by "-2" after a reference symbol.

The image capture apparatus 1 is configured as a digital camera, for example.

As illustrated in FIG. 2, the image capture apparatus 1 includes a CPU (Central Processing Unit) 11-1, ROM (Read Only Memory) 12-1, RAM (Random Access Memory) 13-1, a bus 14-1, an input/output interface 15-1, a clock 16-1, TG (Timing Generator) 17, an image capture unit 18-1, a counter 19-1, a latch 20-1, an input unit 21-1, an output unit 22-1, a storage unit 23-1, a communication unit 24-1, and a drive 25-1.

The CPU 11-1 (processor 11-1) executes various processing according to programs that are recorded in the ROM 12-1, or programs that are loaded from the storage unit 23-1 to the RAM 13-1.

The RAM 13-1 also stores data and the like necessary for the CPU 11-1 to execute the various processing, as appropriate.

The CPU 11-1, the ROM 12-1 and the RAM 13-1 are connected to one another via the bus 14-1. The input/output interface 15-1 is also connected to the bus 14-1. The clock 16-1, the TG 17-1, the image capture unit 18-1, the counter 19-1, the latch 20-1, the input unit 21-1, the output unit 22-1, the storage unit 23-1, the communication unit 24-1, and the drive 25-1 are connected to the input/output interface 15-1.

The clock 16-1 generates a clock signal with a predetermined frequency.

The TG 17-1 (timing generator 17-1) supplies clock pulse/horizontal, vertical synchronization signals to an image capture element 18a-1 (described later) of the image capture unit 18-1 at every predetermined time according to the control by the CPU 11-1 based on the clock signal generated by the clock 16-1. More specifically, based on a single frame cycle (for example, 100 fps) and a clock signal cycle (10 MHz) designated by the CPU 11-1, the number of pulses of the clock signal that should be counted for every frame is calculated (10 MHz/1000 fps=100 k pulse), and a clock pulse for photography is generated every time the clock signal with the number of pulses thus calculated is counted.

The image capture unit 18-1 includes an optical lens unit (not illustrated) and an image sensor (not illustrated).

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, and white balance, as necessary.

The image sensor is configured by an image capture element 18a-1, an AFE (Analog Front End), and the like.

The image capture element 18a-1 is configured by a CMOS (Complementary Metal Oxide Semiconductor) type of optoelectronic conversion device and the like, for example. Light incident through the optical lens unit forms an image of a subject in the image capture element 18a-1. The image capture element 18a-1 optoelectronically converts (i.e. captures) the image of the subject according to a clock pulse supplied from the TG 17, accumulates the resultant image signal for a predetermined time interval, and sequentially supplies the image signal as an analog signal to the AFE.

The AFE executes a variety of signal processing such as A/D (Analog/Digital) conversion processing on the analog image signal. The variety of signal processing generates a digital signal that is output as an output signal from the image capture unit 18-1.

Such an output signal of the image capture unit 18-1 is hereinafter referred to as "captured image data". The captured image data is supplied to the CPU 11-1, an image processing unit (not illustrated) or the like as appropriate. In the image capture apparatus 18-1, with the captured image data acquired at a predetermined frame rate, data of a single moving image is generated.

The counter 19-1 counts a clock signal generated by the clock 16-1. Furthermore, the counter 19-1 resets the count by an external trigger (in the present embodiment, a synchronization signal transmitted from the synchronization control apparatus 2).

Since a counted value of a clock pulse to the image capture element 18a-1 generated by the TG 17-1 and a counted value of a clock signal generated by the clock 16-1 can be converted mutually using the number of pulses of the clock signals that should be counted for every single frame set in the TG 17-1, it may be configured so that the counter 19-1 counts the clock pulse to the image capture element 18a-1 generated by the TG 17-1 in place of counting the clock signal generated by the clock 16-1, or to count both of them.

The latch 20-1 retains a value at the time being counted by the counter 19-1 as a latch value, according to an external trigger (synchronization signal transmitted from the synchronization control apparatus 2 in the present embodiment).

The input unit 21-1 is configured to include various buttons and the like, and inputs a variety of kinds of information in accordance with instructions and operations by the user.

The output unit 22-1 is configured by the display unit, a speaker, and the like, and outputs images and sound.

The storage unit 23-1 is configured by DRAM (Dynamic Random Access Memory) or the like, and stores data of various images.

The communication unit 24-1 controls communication with other devices (not shown) via networks including the Internet. Furthermore, the communication unit 24-1 is configured so as to make it possible to perform wireless communication with the synchronization control apparatus 2 and is configured so as to perform wireless communication implemented based on Bluetooth (Registered Trademark) which is a short-distance radio wave communication standard.

Furthermore, the communication unit 24-1 receives and demodulates a synchronization signal transmitted from the synchronization control apparatus 2 to generate a temporally reliable pulse. In other words, the communication unit 24-1 serves a function of performing communication with the synchronization control apparatus 2, as well as functioning as a temporally reliable pulse generator.

The temporally reliable pulse generated by the communication unit 24-1 is used as an external trigger which resets the count or retains a counted value. The temporally reliable pulse generated by the communication unit 24 is based on the reference time signal outputted from the clock of the highly accurate satellite 100, which is more accurate than the clock generated by the CPU 11-1 and, for example, corresponds to a 4 PPS pulse of the GPS receiver to generate a 4 Hz pulse. For this reason, it is possible to generate pulses at the same timing with sufficient accuracy in the image capture apparatuses 1A and 1B.

A removable medium 31-1 composed of a magnetic disk, an optical disk, a magneto-optical disk, semiconductor memory or the like is installed in the drive 25-1, as appropriate. Programs that are read via the drive 25-1 from the removable medium 31-1 are installed in the storage unit 23-1, as necessary. Similarly to the storage unit 23-1, the removable medium 31-1 can also store a variety of data such as the image data stored in the storage unit 23-1.

With the image capture apparatuses 1A and 1B of the present embodiment, due to the accuracy error upon designing or manufacturing, there is an error on the order of 10 MHz−1% in the accuracy of the clock 16-1A, which is the original clock source of the TG 17-1A that drives the image capture element 18a-1A. Therefore, the image capture apparatus 1A is configured so as to be a clock number of 9.9 MHz, for example. Furthermore, since there is an error on the order of 10 MHz+1% in the accuracy of the clock 16-1B, which is the original clock source of the TG 17-1B that drives the image capture element 18a-1B, the image capture apparatus 1B is configured so as to be a clock number of 10.1 MHz, for example.

Therefore, in a case of performing synchronous photographing of a moving image with the image capture apparatuses 1A and 1B, since the accuracy of the clock 16-1 contains an error of ±1% (−1% in the image capture apparatus 1A and +1% in the image capture apparatus 1B), there is a possibility of being 30.03 frames or 29.97 frames, for example, at a low frame rate (for example, 30 frames per one second) and there is a possibility of being 1001 frames or 999 frames, for example, at a high frame (for example, 1000 frames per one second). No problem arises in a case of performing synchronous photographing at a low frame rate. However, on the other hand, in a case of performing synchronous photographing at a high frame rate, as error is accumulated, a problem of a replay time (number of frames) differing from an actual record time is raised.

Figure 3:
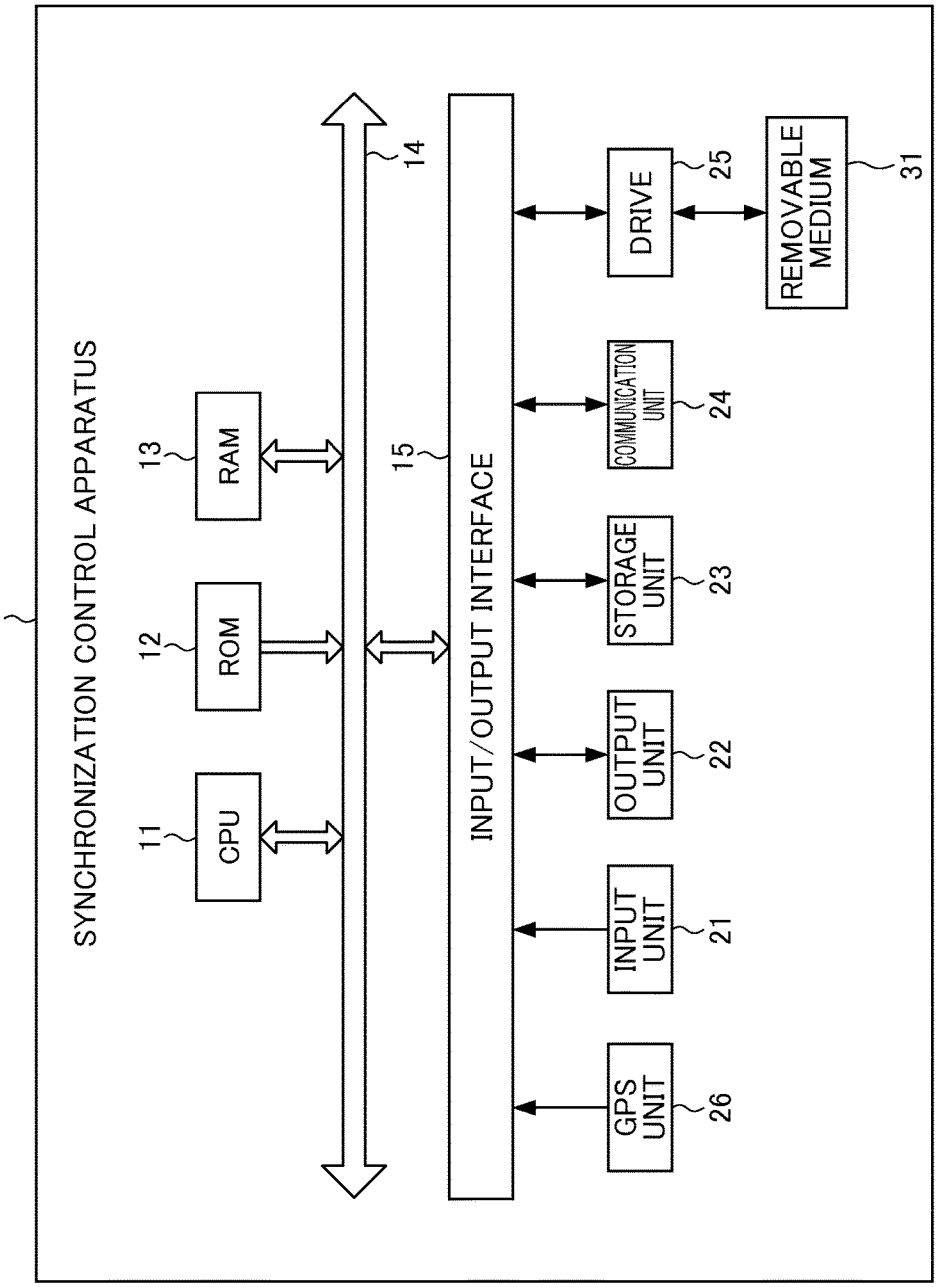
FIG. 3 is a block diagram illustrating a hardware configuration of a synchronization control apparatus according to an embodiment of the present invention.

FIG. 3 is a block diagram illustrating a hardware configuration of the synchronization control apparatus 2 according to the present embodiment.

The synchronization control apparatus 2 is configured by a mobile terminal such as a smartphone.

Furthermore, the synchronization control apparatus 2 includes all of a CPU 11-2 to an input/output interface 15-2, and all of an input unit 21-2 to a GPS unit 26-2 shown in FIG. 3. It should be noted that since the configurations of all of the CPU 11-2 to the input/output interface 15-2 and the input unit 21-2 to a drive 25-2 are similar to the configurations of all of the CPU 11-1 to the input/output interface 15-2 and the input unit 21-1 to the drive 25-1 of the image capture apparatus 1, explanations thereof are omitted.

The GPS unit 26-2 receives a GPS signal including a reference time signal from the satellite 100 that generates a high-accuracy clock signal, which is more accurate than that generated by the image capture apparatus 1. In other words, a punctual (temporally reliable) clock signal of higher accuracy than that generated by the image capture apparatus 1 is generated by the clock 16-2.

The communication unit 24-2 generates a synchronization signal based on the reference time signal received at the GPS unit 26-2, and transmits the synchronization signal to the image capture apparatus 1. As a result, a temporally reliable pulse is generated based on the synchronization signal received at the image capture apparatus 1, and photography control with high accuracy is performed using the temporally reliable pulse.

With the synchronous photographing system S configured as above, since correction is sequentially performed using the temporally reliable pulse generated from the high-accuracy synchronization signal received from the synchronization control apparatus 2, there is no deviation in photography timing even as time elapses, and thus it has a function which allows for performing synchronous photographing in which the number of frames which has been accumulated since the start of photographing becomes equivalent to the originally proper number of frames.

Figure 4:
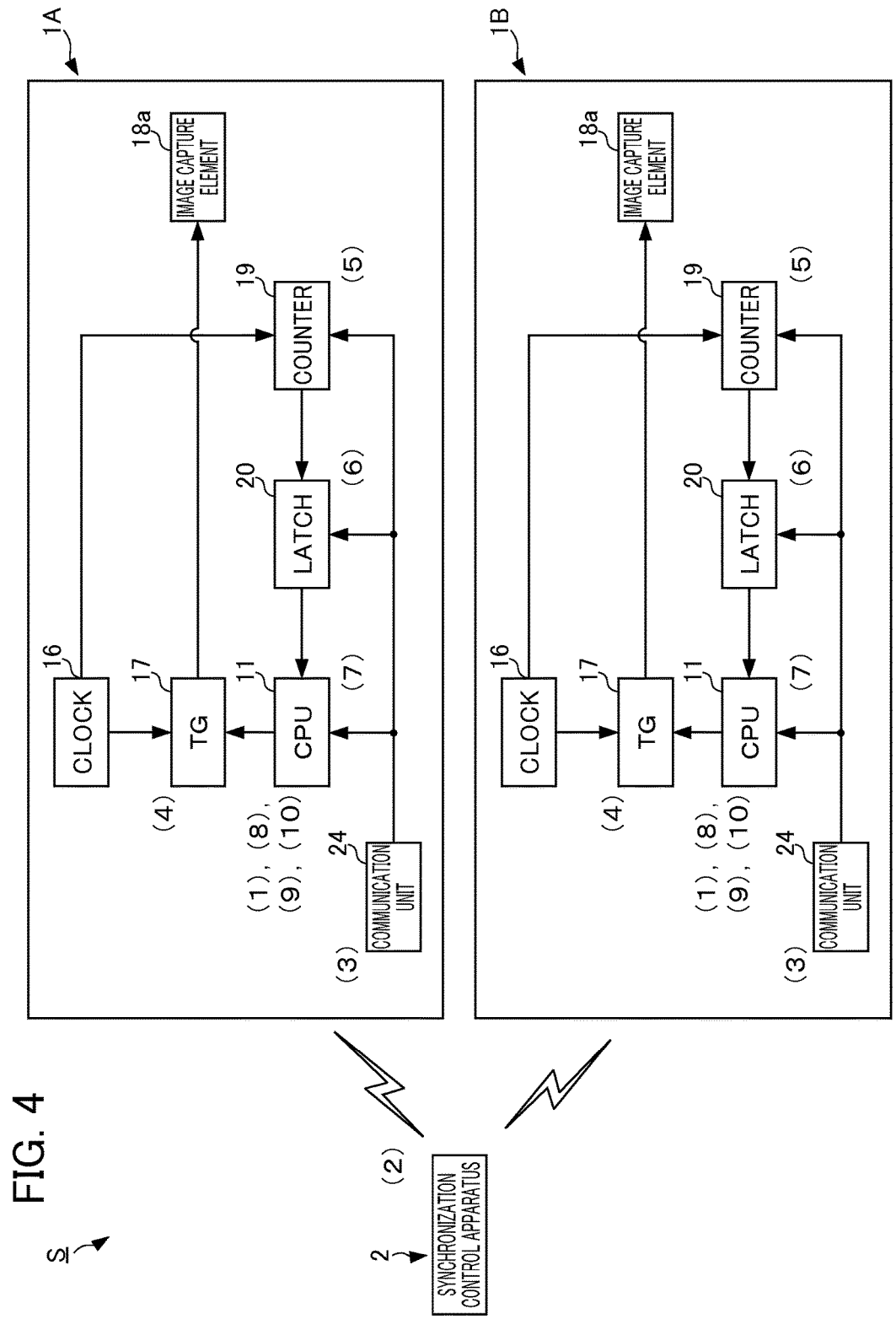
FIG. 4 is a diagram illustrating a flow of synchronous photographing processing on an image capture apparatus side executed by a synchronous photographing system according to an embodiment of the present invention.

FIG. 4 is a diagram illustrating a flow of synchronous photographing processing on an image capture apparatus side executed by the synchronous photographing system S according to the present embodiment.

Synchronous photographing processing" refers to the processing until performing synchronous photographing of a moving image in the image capture apparatuses 1A and 1B based on a synchronization signal from the synchronization control apparatus 2.

The synchronous photographing system S according to the present embodiment executes the following operations of (1) to (10) as illustrated in FIG. 4.

(1) The CPU 11-1 designates, in the TG 17-1, a 100 k pulse (10 MHz/100 frames) as an initial value of the number of pulses that should be counted in accordance with a cycle of a predetermined one frame (100 fps in the present embodiment), based on an instruction from the synchronization control apparatus 2.

(2) The synchronization control apparatus 2 transmits a synchronization signal from the communication unit 24-2 to the image capture apparatuses 1A and 1B based on the reference time signal received from the satellite 100 by the GPS unit 26-2. In the present embodiment, the synchronization signal is transmitted from the communication unit 24-2 at intervals of one second.

(3) The communication unit 24-1 generates a temporally reliable pulse based on the synchronization signal transmitted from the synchronization control apparatus 2.

(4) In a case in which an operation of the TG 17-1 has not started yet, the CPU 11-1 starts the operation of the TG 17-1 at the timing at which receiving an interrupt of the temporally reliable pulse generated by the reception of the synchronization signal from the synchronization control apparatus 2. The TG 17-1 having started the operation then counts a clock signal generated by the clock 16-1, and supplies clock pulse/horizontal, vertical synchronization signals for image capturing to the image capture element 18a-1 every time the number of pulses designated (corresponding to a frame cycle) is counted. As a result, photographing a moving image at a predetermined frame rate (frame cycle) is started.

(5) The counter 19-1 counts the clock signal generated by the clock 16-1. It should be noted that the counter 19-1 resets the count if there is a synchronization signal from a subsequent synchronization control apparatus 2.

(6) The latch 20-1 retains the value counted by the counter 19-1 as a latch value while updating the value every time receiving an interrupt of the temporally reliable pulse generated by the reception of the synchronization signal from the synchronization control apparatus 2 (in the present embodiment, every one second).

(7) The CPU 11-1 reads the latch value from the latch 20-1 every time receiving an interrupt of the temporally reliable pulse generated by the reception of the synchronization signal from the synchronization control apparatus 2 (in the present embodiment, every one second).

(8) The CPU 11-1 calculates the frame cycle until an interrupt of the temporally reliable pulse generated by the reception of a synchronization signal from the subsequent synchronization control apparatus 2 (in the present embodiment, one second) from the latch value thus read.

(9) The CPU 11-1 calculates a frame cycle value (hereinafter, referred to as "correction value") so that the number of frames that has been accumulated since the start of the operation of the TG 17-1 becomes equivalent to the originally proper number of frames designated. It should be noted that the calculation method for a correction value will be described later.

(10) The CPU 11-1 re-designates in the TG 17-1 a frame cycle which is a correction value calculated.

Then, the operations from (2) to (10) are repeated until photographing of a moving image ends. In other words, the CPU 11-1 calculates and re-designates the frame cycle so as to become equivalent to the proper number of frames from the current clock pulse, every time of the interrupt of the temporally reliable pulse generated by the reception of the synchronization signal from the synchronization control apparatus 2. The image capture apparatus 1 is configured so as to adjust a frame cycle which has been simply deviated currently so as to become an appropriate frame cycle, as well as adjusting subsequent frame cycles by taking into account the deviation in the past. Furthermore, the image capture apparatus 1 is configured to adjust so as to become a frame cycle to which the past frame cycles are included after a predetermined interval in order to avoid an excessive adjustment.

Here, the calculation method of a correction value is explained.

Figure 5:
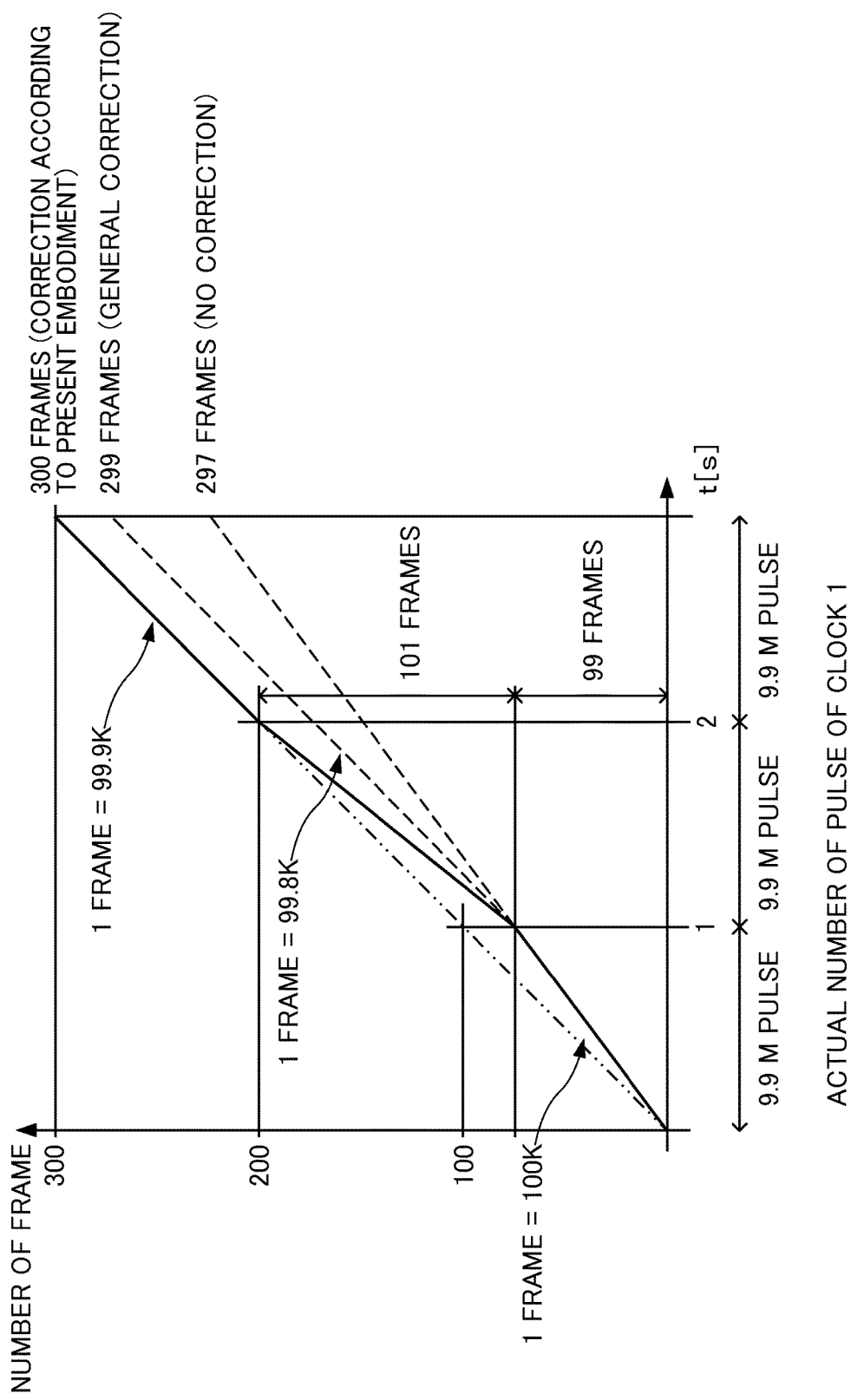
FIG. 5 is a schematic view illustrating a calculation method of a correction value.

FIG. 5 is a schematic view illustrating a calculation method of a correction value.

In the present embodiment, since it is designated so as to perform photographing at a frame rate of 100 fps, as illustrated in FIG. 5, for example, in a case of photographing a moving image for three seconds, photographing 100 frames after one second and photographing 300 frames after a subsequent two seconds are performed.

However, in the present embodiment, with the image capture apparatuses 1A and 1B, there is a design error in the clocks 16-1A and 16-1B, and thus, in a case of not performing the synchronous photographing relating to the present embodiment, only 297 frames are photographed after three seconds in the case of −1% error of the image capture apparatus 1A. Furthermore, even in a case of performing a general correction based on a result of after one second, 299 frames are photographed after three seconds. Therefore, it is not possible to perform photographing of the 300 frames designated.

Therefore, in the synchronous photographing according to the present embodiment, it is configured to identify the number of frames at the moment of a subsequent reception timing for every one second of the reception of the synchronization signal from the synchronization control apparatus 2, and re-designate (correct) a frame cycle by taking into account the excess or deficiency (which has accumulated since the start of photographing). As a result, ultimately, it is possible to perform synchronous photographing so as to become equivalent to the number of frames designated.

For example, in a case of the image capture apparatus 1A with the design error of the clock 16-1A being −1% error, since it is only possible to photograph 99 frames at the time one second after photographing start, it becomes a state lacking one frame. For this reason, the frame rate of 101 frames is designated so as to be 200 frames for the scheduled frame number at the timing (after one second) of the synchronization signal from the subsequent synchronization control apparatus 2. As a result, it is possible to photograph 200 frames after two seconds in accordance with the schedule, and it is also possible to photograph the scheduled 300 frames after three seconds.

More specifically, calculations are performed according to the following formula (1).

[designated frame cycle]=[latch value]/([proper number of frames accumulated at subsequent timing]−[currently accumulated number of frames])    (1)

In a case of the image capture apparatus 1A having the clock number of 9.9 MHz, a latch value from the clock pulse counted is 9.9 M pulses, and the current number of frames corresponds to 99 frames. Due to being photography of 100 fps, the proper number of frames at a subsequent timing is 200 frames.

Therefore, when substituting into the formula (1), it becomes as follows.

[clock number: 9.9 MHz]/([originally proper number of frames accumulated at subsequent timing: 200]−[currently accumulated number of frames: 99])=[designated frame cycle: 98 k pulse]

By re-designating the designated frame cycle as 98 k pulses in the TG 17-1, it is configured to adjust a frame cycle which becomes the final number of frames by taking into account the past frame cycles.

In a case of a further subsequent timing, since there is no deviation between an actual accumulated frame and the proper accumulated frame, when substituted into the formula (1), it becomes as follows.

[clock number: 9.8 MHz]/([proper number of frames accumulated at subsequent timing: 300]−[current accumulated number of frames: 200])=[designated frame cycle: 99 k pulse]

By re-designating the designated frame cycle as 99 k pulses in the TG 17-1, it is configured to adjust a frame cycle which becomes a final number of frames by taking into account the past frame cycles.

On the other hand, in a case of the image capture apparatus 1B having the clock number of 10.1 MHz, a latch value from the clock pulse counted is 10.1 M pulses, and the current number of frames corresponds to 101 frames. Due to being photography of 100 fps, the proper number of frames at a subsequent timing is 200 frames.

Therefore, when substituting into the formula (1), it becomes as follows.

[clock number: 10.1 MHz]/([originally proper number of frames accumulated at subsequent timing: 200]−[currently accumulated number of frames: 101])=[designated frame cycle: 10.2 k pulse]

By re-designating the designated frame cycle as 10.2 k pulses in the TG 17-1, it is configured to adjust a frame cycle which becomes a final number of frames by taking into account the past frame cycles.

In a case of a further subsequent timing, since there is no deviation between an actual accumulated frame and the proper accumulated frame, when substituted into the formula (1), it becomes as follows.

[clock number: 10.2 MHz]/([originally proper number of frames accumulated at subsequent timing: 300]−[currently accumulated number of frames: 200])=[designated frame cycle: 10.1 k pulse]

By re-designating the designated frame cycle as 10.1 k pulse to the TG 17-1, it is configured to adjust a frame cycle which becomes a final number of frames by taking into account the past frame cycles.

Furthermore, the image capture apparatus 1 may be configured to adjust so as to become a frame cycle in which the past frame cycles are included after a predetermined interval in order to avoid an excessive adjustment. In other words, it may be configured to adjust by a predetermined ratio in a step-wise manner so as to become a frame cycle in which the past frame cycles are included after a predetermined interval, only to reach a final completion after the interval. For example, in a case of after two second being equivalent to the final interval, it may be configured so as to adjust with the ratio of 50%. With such a configuration, a moving image is established without bringing about a feeling of strangeness since the adjustment is gradually performed after the final interval.

Figure 6:
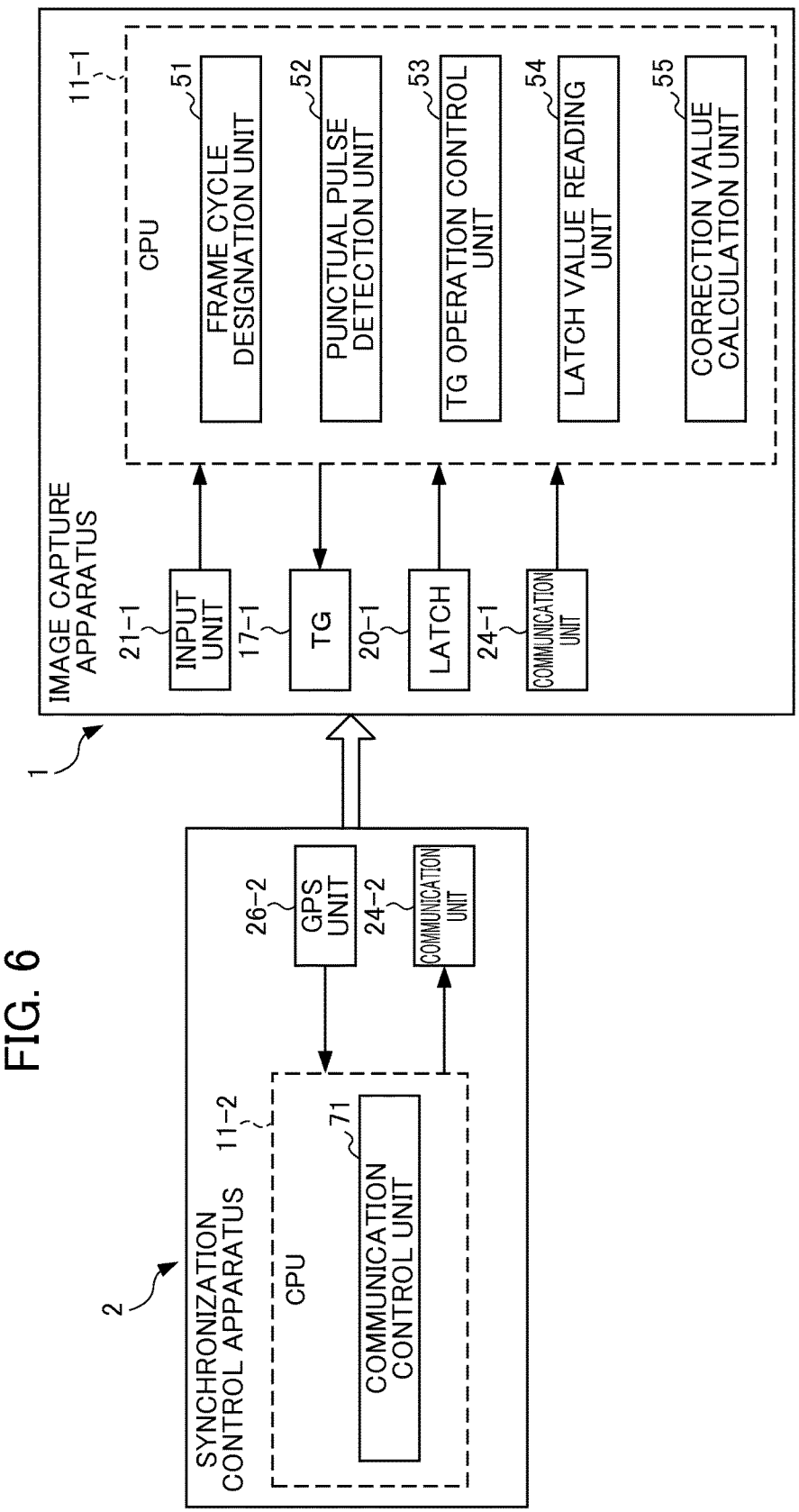
FIG. 6 is a functional block diagram illustrating a functional configuration for executing synchronous photographing processing, among the functional configurations of the image capture apparatus of FIG. 2 and the synchronization control apparatus of FIG. 3.

FIG. 6 is a functional block diagram illustrating a functional configuration for executing synchronous photographing processing, among the functional configurations of the image capture apparatus 1 of FIG. 2 and the synchronization control apparatus 2 of FIG. 3.

In a case of executing the synchronous photographing processing in the image capture apparatus 1, as illustrated in FIG. 6, a frame cycle designation unit 51, a temporally reliable pulse detection unit 52, a TG operation control unit 53, a latch value reading unit 54, and a correction value calculation unit 55 function in the CPU 11-1.

For example, the frame cycle designation unit 51 designates a frame cycle inputted via the input unit 21 or a frame cycle which is a correction value calculated by the correction value calculation unit 55 to the TG 17-1.

The temporally reliable pulse detection unit 52 detects an interrupt of a temporally reliable pulse generated from a synchronization signal received by the communication unit 24-1.

The TG operation control unit 53 performs control of, for example, starting operation of the TG 17-1 based on a temporally reliable pulse detected. As a result, the TG 17-1 supplies clock pulse/horizontal, vertical synchronization signals made by counting the clock 16-1 in the image capture element 18a-1, so as to become a frame cycle designated by the frame cycle designation unit 51. At this time, in the counter 19-1, a clock signal generated by the clock 16-1 is counted. The clock signal thus counted is retained in the latch 20-1 as a latch value.

The latch value reading unit 54 reads a latch value from the latch 20-1 based on a temporally reliable pulse thus detected.

The correction value calculation unit 55 set a correction value so as to become a frame cycle to the image capture element 18a-1 by comparing the timing of the temporally reliable pulse generated from the synchronization signal received by the communication unit 24-1 with the timing of a clock signal generated by the clock 16-1 being generated.

Furthermore, the correction value calculation unit 55 compares the clock signal generated by the clock 16-1 on the basis of timing intervals of the temporally reliable pulse generated from the synchronization signal received from the communication unit 24-1, calculates the deviation amount, and sets as a correction value so as to be a frame cycle to the image capture element 18a-1.

Furthermore, based on the deviation amount calculated based on the accumulated frames at the past timing (generation interval), the correction value calculation unit 55 sets a correction value so as to make a frame cycle to the image capture element 18a-1 at a subsequent timing in order to eliminate, at the subsequent timing, both the deviation amount between the accumulated number of frames in the past and the proper number of frames and the deviation amount between the accumulated number of frames newly predicted in the next timing (an interval of subsequent generation) and the proper number of frames.

The latch 20-1 calculates a frame cycle, which is a correction value, from the latch value read from the latch 20-1. The correction value calculation unit 55 calculates a frame cycle, which is a correction value, based on the following formula (1).

[designated frame cycle]=[latch value]/([originally proper number of frames accumulated at subsequent timing]−[current accumulated number of frames])    (1)

In this case, in a case of the image capture apparatus 1A having the clock number of 9.9 MHz, as illustrated in FIG. 5, the correction value calculation unit 55 calculates [clock number: 9.9 MHz]/([originally proper number of frames accumulated at subsequent timing: 200]−[current accumulated number of frames: 99])=[designated frame cycle: 98 k pulse] as the correction value at the timing one second after the start.

Then, in a case of being at the subsequent timing two second after the start, since there is no deviation between an actual accumulated frame and the proper accumulated frame, the correction value calculation unit 55 calculates [clock number: 9.8 MHz]/([proper number of frames accumulated at subsequent timing: 300]−[current accumulated number of frames: 200])=[designated frame cycle: 99 k pulse] as the correction value.

On the other hand, in a case of the image capture apparatus 1B having the clock number of 10.1 MHz, the correction value calculation unit 55 calculates [clock number: 10.1 MHz]/([proper number of frames accumulated at subsequent timing: 200]−[current accumulated number of frames: 101])=[designated frame cycle: 10.2 k pulse] as the correction value.

Then, in a case of being at the subsequent timing two second after the start, since there is no deviation between an actual accumulated frame and the proper accumulated frame, the correction value calculation unit 55 calculates [clock number: 10.2 MHz]/([proper number of frames accumulated at subsequent timing: 300]−[current accumulated number of frames: 200])=[designated frame cycle: 10.1 k pulse] as the correction value.

It should be noted that, although the deviation amount between an accumulated number of frames which is predicted to be newly generated at the next timing (generation interval) and the proper number of frames is eliminated in the subsequent timing (generation interval), the correction value calculation unit 55 may also be configured so as to make a correction value as a frame cycle to the image capture apparatus 18a-1 at a subsequent timing so that the deviation amount generated in the past is eliminated in the next generation interval by a predetermined ratio. More specifically, in a case of after two second being equivalent to the final interval, the correction value calculation unit 55 may be configured so as to adjust with the ratio of 50%. With such a configuration, a moving image is established without a feeling of strangeness since the adjustment is gradually performed after the final interval.

When the synchronization control apparatus 2 executes the synchronous photographing processing, a communication control unit 71 functions in the CPU 11-2.

The communication control unit 71 controls the communication unit 24-2 to transmit a synchronization signal generated to the image capture apparatus 1, based on a reference time signal received from the satellite 100 by the GPS unit 26-2.

FIG. 7 is a flowchart illustrating a flow of synchronous photographing processing executed by the image capture apparatus 1 (the image capture apparatuses 1A and 1B) of FIG. 2 having the functional configuration of FIG. 6.

The synchronous photographing processing starts by a user's operation of starting synchronous photographing processing on the input unit 21-1. It should be noted that, upon starting the synchronous photographing processing in the image capture apparatus 1, it is configured that an instruction of starting synchronous photographing or setting a frame rate designated from the synchronization control apparatus 2 is made by a user via the input unit 21-1.

In Step S11, the frame cycle designation unit 51 designates a frame cycle in the TG 17-1. More specifically, the frame cycle designation unit 51 designates 100 k pulses as an initial value of a cycle of a frame with 100 fps to the TG 17-1.

In Step S12, the temporally reliable pulse detection unit 52 judges whether a temporally reliable pulse generated by the communication unit 24-1 has been detected based on a synchronization signal transmitted from the synchronization control apparatus 2. It should be noted that the synchronization signal is generated by the communication unit 24-2 based on a clock signal of the clock 16-2 of the synchronization control apparatus 2.

In a case in which the temporally reliable pulse has not been detected, it is judged as NO in Step S12 and it enters a standby state.

In a case in which the temporally reliable pulse has been detected, it is judged as YES in Step S12, and the processing advances to Step S13.

In Step S13, in a case in which operation still not having been started based on the temporally reliable pulse thus detected, the TG operation control unit 53 controls the TG 17-1 so as to start operation. As a result of the control by the TG operation control unit 53, the TG 17-1 supplies clock pulse/horizontal, vertical synchronization signals of the clock 16-1 counted to the image capture element 18a-1. At this moment, a clock signal generated by the clock 16-1 is counted at the counter 19-1. The clock signal counted is retained as a latch value by the latch 20-1.

In Step S14, the latch value reading unit 54 reads the latch value retained by the latch 20-1.

In Step S15, the correction value calculation unit 55 calculates a frame cycle, which is a correction value, based on the latch value thus read and a scheduled accumulated number of frames. More specifically, the correction value calculation unit 55 calculates a frame cycle which is a correction value by the formula (1).

More specifically, in a case of the image capture apparatus 1A having the clock number of 9.9 MHz, the correction value calculation unit 55 calculates [clock number: 9.9 MHz]/([proper number of frames accumulated at subsequent timing: 200]−[current accumulated number of frames: 99])=[designated frame cycle: 98 k pulse] as the correction value at the timing one second after the start.

Then, in a case of being at the subsequent timing two second after the start, since there is no deviation between an actual accumulated frame and the proper accumulated frame, the correction value calculation unit 55 calculates [clock number: 9.8 MHz]/([proper number of frames accumulated at subsequent timing: 300]−[current accumulated number of frames: 200])=[designated frame cycle: 99 k pulse] as the correction value.

On the other hand, in a case of the image capture apparatus 1B having the clock number of 10.1 MHz, the correction value calculation unit 55 calculates [clock number: 10.1 MHz]/([proper number of frames accumulated at subsequent timing: 200]−[current accumulated number of frames: 101])=[designated frame cycle: 10.2 k pulse] as the correction value.

Then, in a case of being at the subsequent timing two second after the start, since there is no deviation between an actual accumulated frame and the original proper accumulated frame, the correction value calculation unit 55 calculates [clock number: 10.2 MHz]/([originally proper number of frames accumulated at subsequent timing: 300]−[currently accumulated number of frames: 200])=[designated frame cycle: 10.1 k pulse] as the correction value.

In Step S16, the frame cycle designation unit 51 re-designates the frame cycle, which is the correction value calculated by the correction value calculation unit 55, in the TG 17-1.

More specifically, in a case of the image capture apparatus 1A having the clock number of 9.9 MHz, the frame cycle designation unit 51 re-designates [designated frame cycle: 98 k pulse] as a correction value thus calculated in a case of being at the timing one second after the start, and re-designates [designated frame cycle: 99 k pulse] as a correction value thus calculated in a case of being at the timing two seconds after the start, as a frame cycle, in the TG 17-1.

Furthermore, in a case of the image capture apparatus 1B having the clock number of 10.1 MHz, the frame cycle designation unit 51 re-designates [designated frame cycle: 10.2 k pulse] as a correction value thus calculated in a case of being at the timing one second after the start, and re-designates [designated frame cycle: 10.1 k pulse] as a correction value thus calculated in a case of being at the timing two seconds after the start, as a frame cycle, in the TG 17-1.

Then, the TG 17-1 supplies clock pulse/horizontal, vertical synchronization signals to the image capture element 18a-1 so as to perform photographing with the frame cycle thus re-designated. As a result, photographing of a moving image is performed so as to finally make the number of frames based on the designation from the image capture unit 18.

In Step S17, the CPU 11-1 judges whether photographing has ended. In a case in which the photographing has ended, it is judged as YES in Step S17, and the synchronous photographing processing ends.

In a case in which the photographing has not ended, it is judged as NO in Step S17, and the processing returns to Step S12.

Then, photographing is performed with a re-designated frame cycle and, furthermore, processing is sequentially performed in which a frame cycle that is a correction value is calculated and set again from a result of photographing.

The synchronous photographing system S corrects one frame cycle so that the accumulated number of frames since the start of photographing becomes equivalent to the proper number of frames, by using a high-accuracy temporally reliable pulse of the synchronization control apparatus 2 that is more accurate than that of the image capture apparatuses 1A and 1B. Therefore, in the synchronous photographing system S, photography timing is not deviated between the image capture apparatuses 1A and 1B even with the elapse of time, and the total number of frames matches therebetween. In other words, since the synchronous photographing system is configured so that, upon synchronizing photography timing in a plurality of the image capture apparatuses 1A and 1B, commonly uses a high-accuracy temporally reliable pulse relative to the clock of the image capture element 18a-1 in the plurality of the image capture apparatuses 1A and 1B, counts the clock of the image capture element 18a-1 at every timing of the temporally reliable pulse, and, based on a result of counting, calculates a correction value so that an accumulated number of frames since the start of the operation of the TG 17-1 becomes equivalent to the proper number of frames, a result of which it is possible to realize high-accuracy synchronous photographing even if the clock frequency of the image capture element 18a-1 differs between the image capture apparatuses 1A and 1B.

The image capture apparatus 1 configured as above includes the TG 17-1, the communication unit 24-1, the correction value calculation unit 55, and the TG operation control unit 53.

The TG 17-1 generates a clock pulse, which is a frame synchronization signal at a constant cycle.

The communication unit 24-1 inputs a reference signal generated at a predetermined interval based on a predetermined reference cycle.

The correction value calculation unit 55 compares the generation timing of the reference signal inputted by the communication unit 24-1 with the generation timing of a clock pulse, which is a frame cycle signal generated by the TG 17-1.

The TG operation control unit 53 adjusts a generation cycle of the clock pulse, which is the frame synchronization signal generated by the TG 17-1, based on the comparison result from the correction value calculation unit 55.

With the image capture apparatus 1, it is thereby possible to perform high-accuracy synchronization of the photography timing of the own camera more efficiently relative to reference timing.

The TG 17-1 counts the clock signal of the clock 16-1 with a predetermined accuracy and generates at a constant cycle a clock pulse, which is a frame synchronization signal, every time a predetermined number of clock signals is counted.

The communication unit 24-1 inputs a reference signal generated at a predetermined interval based on a high-accuracy reference cycle that is more accurate than that of the clock signal of the clock 16-1.

The correction value calculation unit 55 measures a generation interval of the reference signal inputted by the communication unit 24-1, with the clock signal of the clock 16-1 having a predetermined accuracy as a reference, and calculates a deviation amount by comparing a measurement cycle thus measured with a predetermined interval.

Based on the deviation amount calculated by the correction value calculation unit 55, the TG operation control unit 53 adjusts the generation cycle of the clock pulse, which is a frame synchronization signal, by changing a predetermined number by which the TG 17-1 counts the clock signal of the clock 16-1.

With the image capture apparatus 1, it is thereby possible to perform high-accuracy synchronization since the cycle of photography timing of the own camera is adjusted based on the reference cycle which is higher accuracy than that of the clock signal of the own clock 16-1.

Furthermore, the image capture apparatus 1 further includes the frame cycle designation unit 51 that determines a generation cycle of the clock pulse, which is a frame synchronization signal.

The correction value calculation unit 55 calculates a deviation amount of a generation cycle of the clock signal, which is generated by the clock 16-1 with respect to a reference cycle, for every generation interval of each of the reference signals inputted by the communication unit 24-1.

Based on the deviation amount calculated based on the generation interval in the past by the correction value calculation unit 55, the frame cycle designation unit 51 determines a generation cycle of the clock pulse, which is a frame synchronization signal in a subsequent generation interval, so as to eliminate, in the subsequent generation interval, both the deviation amount generated in the past and the deviation amount predicted to be generated newly in the subsequent generation interval.

With such a configuration, in the image capture apparatus 1, it is possible to perform high-accuracy synchronization in order to determine a generation cycle of the clock pulse which is a frame synchronization signal so as to synchronize ultimately by taking into account the deviation amount generated in the past.

Although the deviation amount predicted to be newly generated in a next generation interval is eliminated in the next generation interval, the frame cycle designation unit 51 determines a generation cycle of the clock pulse, which is a frame synchronization signal in the subsequent generation interval, so as to eliminate the deviation amount generated in the past in the next generation interval by a predetermined ratio.

Since the image capture apparatus 1 determines the generation cycle of the clock pulse which is a frame synchronization signal in the subsequent generation interval so as to eliminate the deviation amount generated in the past in the subsequent generation interval by a predetermined ratio, it is thereby possible to perform adjustment without a feeling of strangeness during the process of matching the synchronization.

The TG operation control unit 53 controls the TG 17-1 so as to perform synchronous photographing with a plurality of other image capture apparatuses 1.

The communication unit 24-1 inputs a common reference signal with the plurality of other image capture apparatuses 1.

The TG operation control unit 53 adjusts a generation cycle of the clock signal, which is a frame synchronization signal generated by the clock 16-1 based on a comparison result from the correction value calculation unit 55, so as to be the same as that of the plurality of other image capture apparatuses 1.

With the image capture apparatus 1, it is thereby possible to perform high-accuracy synchronization with the plurality of other image capture apparatuses 1.

The communication unit 24-1 inputs a GPS signal inputted based on the clock of the satellite 100 which is a higher accuracy clock than the clock of the image capture apparatus 1, as a reference signal.

With the image capture apparatus 1, since it is thereby possible to use a more accurate signal as a reference signal, it becomes possible to perform more accurate synchronization.

It should be noted that the present invention is not to be limited to the aforementioned embodiment, and that modifications, improvements, etc. within a scope that can achieve the objects of the present invention are also included in the present invention.

In the abovementioned embodiment, if the interval of the temporally reliable pulse is known in advance, the pulse may not be configured to be punctual.

Furthermore, although, in the abovementioned embodiment, the clock to the image capture element is counted directly, another clock which is known to fluctuate in a similar manner may be counted. For example, another clock that is multiplied or divided from the same clock source may be employed.

Furthermore, although the interrupt of the CPU is used for all of the processing of counting to correcting, it may be configured to be hard-wired.

Furthermore, although the latch 20-1 is configured as hardware in the abovementioned embodiment, it may be configured as software.

Furthermore, although the synchronization control apparatus 2 and the image capture apparatus 1 are configured to acquire high-accuracy clock signals via the GPS signals including the high-accuracy reference time signal of the satellite 100 in the abovementioned embodiment, it may be configured so as to acquire by way of communication such as optical communication from an apparatus that generates a high-accuracy high clock signal.

Furthermore, the image capture apparatus 1 may be configured to receive the reference time signal of the satellite 100 directly. Furthermore, although it is configured to perform wireless communication, it may be configured so as to perform wired communication.

Furthermore, in the abovementioned embodiment, although it is configured to perform synchronous photographing with the plurality of image capture apparatuses 1 based on the synchronization signal from the synchronization control apparatus 2, it may be configured so that photographing can be performed so as to be handled on a side as a reference, such as a main device and a sub device.

More specifically, the communication unit 24-1 can be configured so as to input a signal transmitted from one among the plurality of other image capture apparatuses 1 serving as a main device, as a reference signal.

In the aforementioned embodiments, a digital camera has been described as an example of the image capture apparatus 1 to which the present invention is applied; however, the present invention is not limited thereto in particular.

For example, the present invention can be applied to any electronic device in general having a synchronous photographing processing function. More specifically, for example, the present invention can be applied to a lap-top personal computer, a printer, a television receiver, a video camera, a portable navigation device, a cell phone device, a smart phone, a portable gaming device, and the like.

The processing sequence described above can be executed by hardware, and can also be executed by software.

In other words, the hardware configuration shown in FIG. 6 is merely an illustrative example, and the present invention is not particularly limited thereto. More specifically, the types of functional blocks employed to realize the above-described functions are not particularly limited to the example shown in FIG. 6, so long as the image capture apparatus 1 can be provided with functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 2 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 2, a hard disk included in the storage unit 23 shown in FIG. 2 or the like, in which the program is recorded.

It should be noted that, in the present specification, the steps describing the program recorded in the storage medium include not only the processing executed in a time series following this order, but also processing executed in parallel or individually, which is not necessarily executed in a time series.

In addition, in the present specification, the terminology of system shall mean all devices configured from a plurality of devices, a plurality of means, and the like.

Furthermore, there is freedom as to how to divide a plurality of functions (processing, units) necessary to acquire various effects as described above, and an example thereof is described below.

(Configuration 1)

It is configured so as to include: a timing generator (a timing generation unit) that generates a frame synchronization signal with a constant cycle; a communication unit (reference signal input unit) that receives (inputs) a reference signal generated at a predetermined interval based on a predetermined reference cycle; and a CPU (comparison unit, adjustment unit) that compares generation timing of the reference signal received by the communication unit with generation timing of the frame synchronization signal generated by the timing generator, and adjusts a generation cycle of the frame synchronization signal generated by the timing generator based on a result of the comparison.

(Configuration 2)

In the abovementioned configuration, it is further configured so that:

the timing generator counts a clock having a predetermined accuracy, and generates a frame synchronization signal at a constant cycle every time a predetermined number of clocks is counted, the communication unit receives a reference signal generated at a predetermined interval based on a high-accuracy reference cycle that is more accurate than the clock, and the CPU measures a generation interval of the reference signal received by the communication unit with the clock having a predetermined accuracy as a reference, calculates a deviation amount by comparing a measurement cycle measured with the predetermined interval, and, based on the deviation amount calculated, adjusts the generation cycle of the frame synchronization signal by changing the predetermined number at which the timing generator counts the clock.

(Configuration 3)

In the abovementioned configuration, it is further configured so that:

the CPU calculates a deviation amount of the generation cycle of the frame synchronization signal generated by the timing generator with respect to the reference cycle for every generation interval of each of the reference signal received by the communication unit, and, based on the deviation amount calculated based on a previous generation interval, determines the generation cycle of the frame synchronization signal in a subsequent generation interval in order to eliminate, in the subsequent generation interval, both a deviation amount generated previously and a deviation amount predicted to be generated newly in the subsequent generation interval.

(Configuration 4)

In the abovementioned configuration, it is further configured so that:

the CPU determines a generation cycle of the frame synchronization signal for a subsequent generation interval so as to eliminate a deviation amount predicted to be newly generated in a next generation interval, while eliminating a deviation amount generated previously by a predetermined ratio in the next generation interval.

(Configuration 5)

In the abovementioned configuration, it is further configured so that:

the CPU controls to perform synchronous photographing with a plurality of other image capture apparatuses, the communication unit receives a reference signal shared with the plurality of other image capture apparatuses, and the processor adjusts the generation cycle of the frame synchronization signal generated by the timing generator based on the result of the comparison so as to be the same as that of the plurality of other image capture apparatuses.

(Configuration 6)

In the abovementioned configuration, it is further configured so that:

the communication unit receives a GPS signal as the reference signal.

(Configuration 7)

In the abovementioned configuration, it is further configured so that:

the communication unit receives, as the reference signal, a signal transmitted from one among a plurality of image capture apparatuses established as a main device.

What is claimed is:

1. An image capture apparatus comprising:
    a timing generator that generates a frame synchronization signal with a constant generation cycle;
    a communication unit that receives a reference signal which is generated at a predetermined interval based on a predetermined reference cycle; and
    a processor that compares a generation timing of the reference signal received by the communication unit with a generation timing of the frame synchronization signal generated by the timing generator, and adjusts the generation cycle of the frame synchronization signal generated by the timing generator based on a result of the comparison,
    wherein the timing generator is configured to generate a plurality of the frame synchronization signals with the constant generation cycle even when the reference signal is not received at a constant cycle, and after the constant generation cycle is adjusted, to generate the plurality of the frame synchronization signals with the adjusted constant generation cycle without receiving the reference signal.

2. The image capture apparatus according to claim 1, wherein:
    the timing generator counts clock signals of a clock having a predetermined accuracy, and generates the frame synchronization signal at the constant generation cycle every time a predetermined number of clock signals is counted,
    the communication unit receives the reference signal which is generated at the predetermined interval based on a high-accuracy reference cycle that is more accurate than the clock, and
    the processor measures a generation interval of the reference signal received by the communication unit with the clock having the predetermined accuracy as a reference, calculates a deviation amount by comparing a measurement cycle measured with the predetermined interval, and based on the deviation amount calculated, adjusts the generation cycle of the frame synchronization signal by changing the predetermined number of clock signals to be counted by the timing generator.

3. The image capture apparatus according to claim 1, wherein the processor calculates a deviation amount of the generation cycle of the frame synchronization signal generated by the timing generator with respect to the reference cycle for every generation interval of each reference signal received by the communication unit and, based on the deviation amount calculated based on a previous generation interval, determines the generation cycle of the frame synchronization signal for a subsequent generation interval in order to eliminate, in the subsequent generation interval, both a deviation amount generated previously and a deviation amount predicted to be newly generated in the subsequent generation interval.

4. The image capture apparatus according to claim 3, wherein the processor determines the generation cycle of the frame synchronization signal for the subsequent generation interval so as to eliminate the deviation amount predicted to be newly generated in a next generation interval, while eliminating a deviation amount generated previously by a predetermined ratio in the next generation interval.

5. The image capture apparatus according to 1, wherein:
the processor controls to perform synchronous photographing with a plurality of other image capture apparatuses,
the communication unit receives the reference signal which is shared with the plurality of other image capture apparatuses, and
the processor adjusts the generation cycle of the frame synchronization signal generated by the timing generator based on the result of the comparison so as to be the same as that of the plurality of other image capture apparatuses.

6. The image capture apparatus according to claim 1, wherein the communication unit receives a GPS signal as the reference signal.

7. The image capture apparatus according to claim 1, wherein the communication unit receives, as the reference signal, a signal transmitted from one among a plurality of image capture apparatuses established as a main device.

8. The image capture apparatus according to claim 1, wherein the constant generation cycle is defined by an interval between successive generated frame synchronization signals.

9. The image capture apparatus according to claim 1, wherein the processor adjusts the generation cycle by adjusting an interval between successive timings at which the frame synchronization signals are generated.

10. An image capture control method executed by an image capture apparatus, the method comprising:
allowing a timing generator to generate a frame synchronization signal at a constant generation cycle;
receiving, by a communication unit, a reference signal which is generated at a predetermined interval based on a predetermined reference cycle;
comparing a generation timing of the reference signal received by the communication unit with a generation timing of the frame synchronization signal generated by the timing generator, and
adjusting the generation cycle of the frame synchronization signal generated by the timing generator based on a result of the comparison,
wherein the timing generator is configured to generate a plurality of the frame synchronization signals with the constant generation cycle even when the reference signal is not received at a constant cycle, and after the constant generation cycle is adjusted, to generate the plurality of the frame synchronization signals with the adjusted constant generation cycle without receiving the reference signal.

11. The image capture control method according to claim 10, wherein the timing generator counts clock signals of a clock having a predetermined accuracy, and generates the frame synchronization signal at the constant generation cycle every time a predetermined number of clock signals is counted, and wherein the method further comprises:
receiving, by the communication unit, the reference signal which is generated at the predetermined interval based on a high-accuracy reference cycle that is more accurate than the clock,
measuring a generation interval of the reference signal received with the clock having the predetermined accuracy as a reference,
calculating a deviation amount by comparing a measurement cycle measured with the predetermined interval, and
based on the deviation amount calculated, adjusting the generation cycle of the frame synchronization signal by changing the predetermined number of clock signals to be counted by the timing generator.

12. The image capture control method according to claim 10, further comprising:
calculating a deviation amount of the generation cycle of the frame synchronization signal generated by the timing generator with respect to the reference cycle for every generation interval of each reference signal received by the communication unit and, based on the deviation amount calculated based on a previous generation interval, determining the generation cycle of the frame synchronization signal for a subsequent generation interval in order to eliminate, in the subsequent generation interval, both a deviation amount generated previously and a deviation amount predicted to be newly generated in the subsequent generation interval.

13. A non-transitory storage medium encoded with a computer-readable program that enables a computer to execute functions comprising:
a timing generation function that generates a frame synchronization signal with a constant generation cycle;
a reference signal input function that inputs a reference signal which is generated at a predetermined interval based on a predetermined reference cycle;
a comparison function that compares a generation timing of the reference signal inputted by the reference signal input function with a generation timing of the frame synchronization signal generated by the timing generation function; and
an adjustment function that adjusts the generation cycle of the frame synchronization signal generated by the reference signal input function based on a result of the comparison,
wherein the timing generation function is configured to generate a plurality of the frame synchronization signals with the constant generation cycle even when the reference signal is not received at a constant cycle, and after the constant generation cycle is adjusted, to generate the plurality of the frame synchronization signals with the adjusted constant generation cycle without receiving the reference signal.

14. The non-transitory storage medium according to claim 13, wherein the program enables the computer to execute further functions comprising:
counting clock signals of a clock having a predetermined accuracy, and generating the frame synchronization signal at the constant generation cycle every time a predetermined number of clock signals is counted,
receiving the reference signal which is generated at the predetermined interval based on a high-accuracy reference cycle that is more accurate than the clock, and
measuring a generation interval of the reference signal received by the-receiving with the clock having the predetermined accuracy as a reference, calculating a deviation amount by comparing a measurement cycle measured with the predetermined interval, and based on the deviation amount calculated, adjusting the generation cycle of the frame synchronization signal by changing the predetermined number of clock signals to be counted by the counting.

15. The non-transitory storage medium according to claim 13, wherein the program enables the computer to execute further functions comprising:

calculating a deviation amount of the generation cycle of the frame synchronization signal generated by the timing generation function with respect to the reference cycle for every generation interval of each reference signal inputted by the reference signal input function, and based on the deviation amount calculated based on a previous generation interval, determining the generation cycle of the frame synchronization signal for a subsequent generation interval in order to eliminate, in the subsequent generation interval, both a deviation amount generated previously and a deviation amount predicted to be newly generated in the subsequent generation interval.

\* \* \* \* \*